United States Patent
Samardzich et al.

[11] Patent Number: 5,845,734
[45] Date of Patent: Dec. 8, 1998

[54] SLIDE OUT ENGINE MOUNTING SYSTEM FOR AUTOMOTIVE VEHICLE

[75] Inventors: Raul Jose Samardzich, Farmington Hills; Oliver Gerald Miller, Taylor; Lutfi Saleh Sharif, Canton, all of Mich.

[73] Assignee: Ford Global Technologies, Inc., Dearborn, Mich.

[21] Appl. No.: 901,518

[22] Filed: Jul. 28, 1997

[51] Int. Cl.[6] ....................................................... B60K 5/02
[52] U.S. Cl. ........................................... 180/299; 248/638
[58] Field of Search .................................. 180/68.5, 298, 180/299; 248/638, 657, 635, 647, 674

[56] References Cited

U.S. PATENT DOCUMENTS 1,789,580  3/1931  Bell .......................................... 248/638
4,850,448  7/1989  Stephens ................................... 180/299

FOREIGN PATENT DOCUMENTS 501161  2/1939  United Kingdom ................... 248/638

*Primary Examiner*—D. Glenn Dayoan
*Assistant Examiner*—Clovia Hamilton
*Attorney, Agent, or Firm*—Jerome R. Drouillard

[57] ABSTRACT

A mounting system for supporting an engine within a chassis frame of an automotive vehicle includes a chassis bracket adapted for attachment to a chassis frame and having a mounting pin extending laterally into an engine compartment, and an engine bracket adapted for attachment to an engine, with the engine bracket having a first portion for attaching the engine bracket to an engine and a second portion having at least one generally horizontal surface for engaging the chassis bracket slidably along an axis parallel to a horizontal plane defined by the chassis frame.

2 Claims, 3 Drawing Sheets

SLIDE OUT ENGINE MOUNTING SYSTEM FOR AUTOMOTIVE VEHICLE

BACKGROUND OF THE INVENTION

1. Technical Field

The present invention relates to a mounting system for slidably mounting and removing an engine within the chassis of an automotive vehicle.

2. Disclosure Information

Although advances have been made in the construction of automotive power plants to the extent that conventional reciprocating internal combustion engines may be expected to operate for many miles before major maintenance is needed, the fact remains that engines, particularly those used in commercial vehicles, must be removed for certain maintenance operations. Unfortunately, the package requirements of certain commercial vehicles has rendered the removal of such engines more time consuming and therefore more expensive, because with conventional mounting systems, such as that shown in FIG. 4, it is required that the engine actually be lifted vertically above its installed position before the engine may be moved forward in the vehicle so as to disengage the engine from the engine mounts. The requirement to lift the engine necessitates, in some cases, dismantling of parts of the cab itself on vehicles where the engine compartment extends under the cowl of a cab. Of course, such disassembly results in greater labor costs at a time when automotive manufacturers are seeking to reduce the cost of repairs. The present invention allows mounting of an engine within the frame of a vehicle and subsequent slidable disengagement of the engine from the frame of the vehicle with only minimal, if any, lifting the engine above its installed position.

SUMMARY OF THE INVENTION

A mounting system for supporting an engine within a chassis frame of an automotive vehicle includes a chassis bracket adapted for attachment to the chassis frame, with the chassis bracket having a mounting pin extending laterally into an engine compartment, and an engine bracket adapted for attachment to an engine, with the engine bracket having a first portion for attaching the engine bracket to an engine and a second portion having at least one generally horizontal surface for engaging the chassis bracket. The chassis bracket and the engine bracket are slidably engageable along an axis parallel to a horizontal plane defined by the chassis frame. The chassis bracket extends laterally inwardly from a frame rail in a direction generally perpendicular to the centerline of the chassis frame. It is expected that normally the first portion of the engine bracket will be rigidly attached to an engine, whereas the chassis bracket will be rigidly attached to the chassis frame.

A retainer maintains the engine bracket in engagement with the chassis bracket. The retainer is removably attached to the engine bracket with fasteners such as bolts.

As an option, the second portion of the engine bracket may further comprise a downwardly extending leg or hook for maintaining the engine bracket and engine in contact with the chassis bracket and chassis in the event that the retainer is not attached to the engine bracket, such as when the retainer is inadvertently omitted from the assembly or becomes detached from the assembly due to fastener failure.

The engine bracket preferably further comprises a generally vertical surface for engaging a generally vertical surface of the chassis bracket so as to limit rearward axial engagement of the engine bracket with respect to the chassis bracket.

According to another aspect of the present invention, a mounting pin, used with the present invention, comprises the rigid core attached to a chassis frame, a rigid shell extending about the core, and an elastomeric material interposed therebetween. The rigid shell defines a multiplanar mounting surface having horizontal upper and lower portions and front and rear inclined portions extending between the upper and lower portions. The second portion of the engine bracket has at least one generally horizontal surface for slidably engaging the horizontal upper portion of the mounting pin and an inclined surface for abuttingly engaging the front inclined portion of the mounting pin such that when the inclined surface abuts the front inclined portion of the mounting pin the engine is prohibited from moving rearwardly in the chassis. The previously described retainer has an inclined portion for engaging the rear inclined portion of the mounting pin and a slider portion for engaging the horizontal lower portion of the mounting pin.

The present mounting system may comprise chassis brackets installed upon at least two laterally opposing portions of the chassis frame, with at least two corresponding engine brackets mounted upon the engine at laterally displaced locations such that the mounting system supports an entire end of the engine.

The present system offers the additional advantage that physically larger engines may be packaged within the space formerly occupied by smaller engines, thereby allowing a vehicle to be repowered with a larger engine.

Other advantages, as well as objects and features of the present invention will become apparent to the reader of this specification.

DETAILED DESCRIPTION OF PREFERRED EMBODIMENTS

Figure 3:
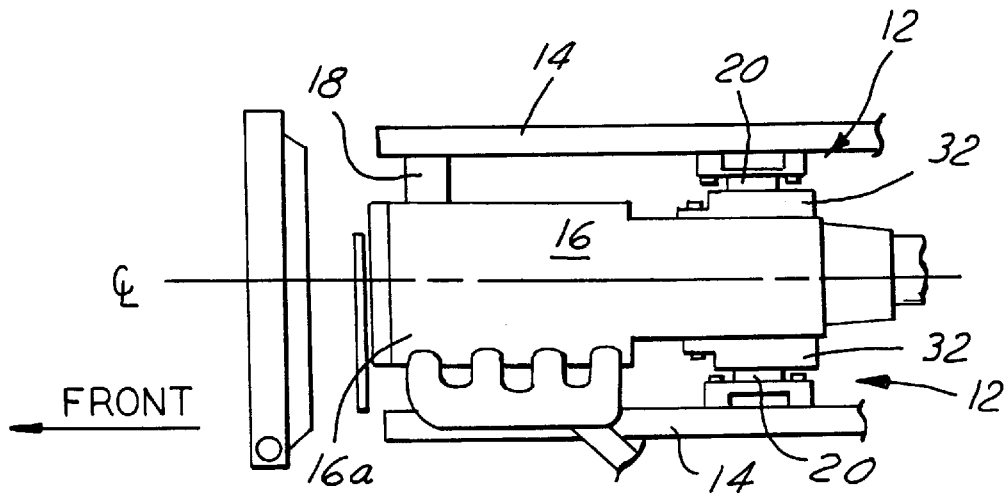
FIG. 3 is a plan view of an engine installed in a chassis frame with a mounting system according to the present invention.
Figure 4:
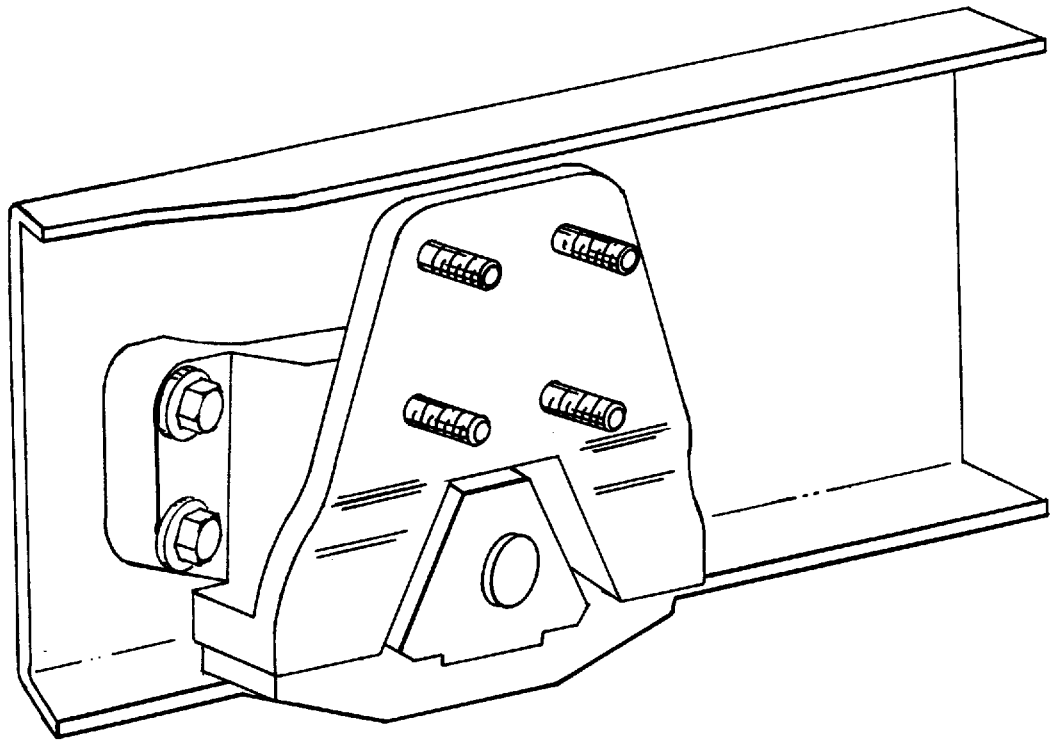
FIG. 4 illustrates a prior art engine mounting system used in commercial vehicles.

As shown in FIG. 3, engine 16 is mounted within frame rails 14 of an automotive vehicle by means of present mounting system 12, which includes chassis brackets 20 rigidly mounted to frame rails 14 and engine brackets 32 rigidly mounted to engine 16. Although the front of engine 16, which is labeled 16a, is shown as being supported by cross member 18 which extends between frame rails 14, those skilled in the art will appreciate in view of this disclosure, that the present mounting system could be additionally employed at all four corners of an engine or at only the front of the engine. If the present system is used at only the front of an engine, a transmission mount may be employed to support the rear of the engine. In any event, the present slide out mounting system may be used in many other types of combinations known to those skilled in the art and suggested by this disclosure.

Figure 1:
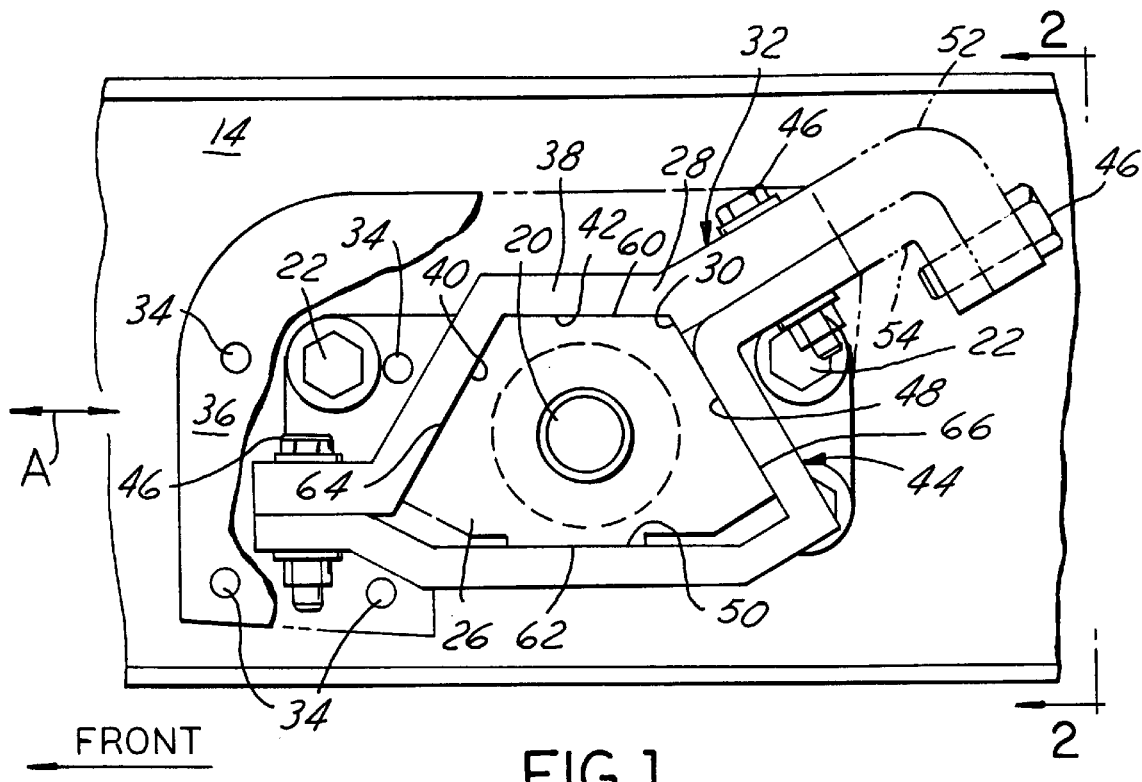
FIG. 1 is a side view of a slide out engine mounting system according to the present invention.

Turning now to FIG. 1, engine bracket 32 is attached to engine 16 by means of a plurality of bolts 34. Bolts 34 extend through first portion 36 of engine bracket 32. Second portion 38 of engine bracket 32 is integral with the first portion, and includes generally horizontal surface 42 which engages chassis bracket 20. Because chassis bracket 20 and engine bracket 32 are slidably engageable along an axis which is parallel to horizontal plane A, which is defined by frame rails 14, an engine having a mounting system according to the present invention may be removed from a vehicle without lifting the engine above its installed height. In this regard, it is noted that installation abutment 30, which is formed as an integral part of second portion 38 of engine bracket 32, requires that engine 16 be "bumped" over chassis bracket 20 when engine 16 is removed from the vehicle. In practice, this bumping will amount to little more than a minor rotation of an outer portion of chassis bracket 20, which as described below, is mounted with elastomeric material. The purpose of installation abutment 30 is to provide a tactile cue to the engine installer, who will feel engine 16 nest upon the mounts when the engine is slid into the chassis. This cue is available even if installation abutment 30 is quite small; therefore no additional lifting of engine 16 will be required above and beyond that which is of course required to permit sliding movement of engine bracket 32 with respect to chassis bracket 20.

Engine bracket 32 cooperates with chassis bracket 20 to limit rearward movement of the engine within the chassis frame when the engine is installed. Thus, engine bracket 32 further incorporates inclined surface 40 which contacts front inclined portion 64 of rigid shell 28 which is part of chassis bracket 20. The abutting engagement provided by surface 40 of engine bracket 32 and front inclined portion 64 of rigid shell 28 is best seen from FIG. 1. The interaction of engine bracket 32 and chassis bracket 20 prohibit engine 16 from moving rearwardly in the chassis once this abutting engagement has been achieved.

Of course, a principal function of the mounting system is to locate engine 16 vertically in the chassis frame. This is accomplished by means of generally horizontal surface 42 which is formed on second portion 38 of engine bracket 32. Generally horizontal surface 42 abuttingly engages horizontal upper portion 60 of mounting pin shell 28.

Engine bracket 32 is maintained in contact with chassis bracket 20 by means of retainer 44 which is removably attached to engine bracket 32.

Retainer 44 is maintained in engagement with engine bracket 32 by means of a plurality of retainer bolts 46. Retainer 44 also serves to abuttingly engage mounting pin rigid shell 28 of the mounting pin. Thus, retainer 44 has inclined portion 48 for abuttingly engaging rear inclined portion 66 of mounting pin shell 28. And, retainer 44 further has slider portion 50 for engaging the horizontal lower portion 62 of mounting pin shell 28.

Figure 2:
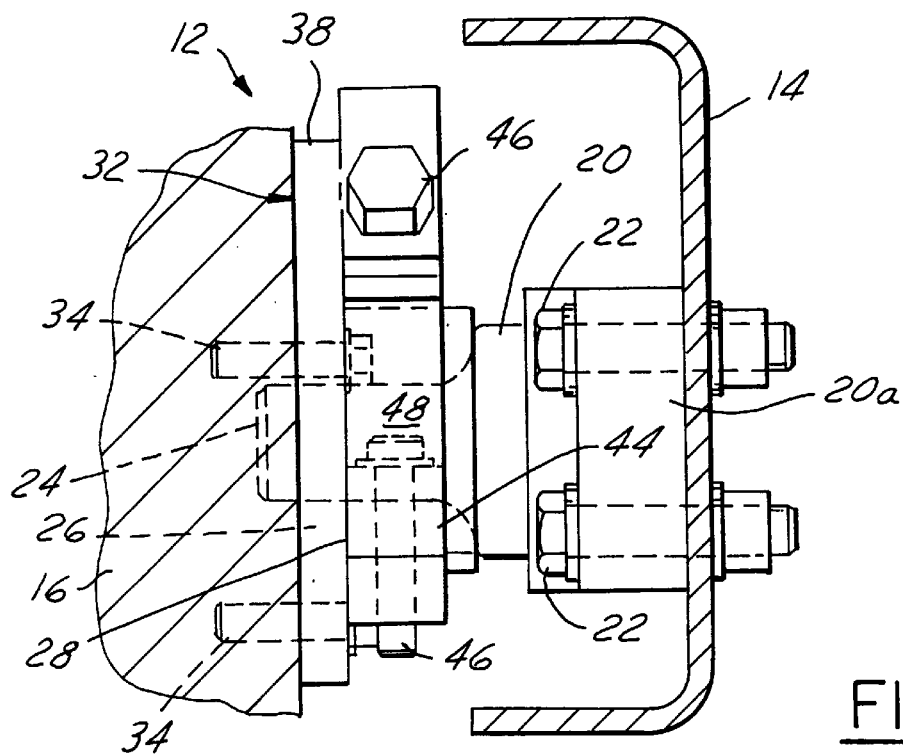
FIG. 2 is an end view of the system of FIG. 1 taken along the line 2—2 of FIG. 1.

It is thus seen with particularity in FIG. 2 that retainer 44 and engine bracket 32 cooperate to confine an axially extending portion of mounting pin shell 28.

If desired, engine bracket 32 may be modified by adding a downwardly extending leg or hook 52 (FIG. 1), which may also be incorporated as hook 54 on retainer 44. If this feature is added, engine 16 will be maintained in contact with frame rails 14 in the event of the failure of fastener 46.

FIG. 2 shows further details of the present invention, including chassis bracket 20 which is shown as being mounted by means of bolts 22 to frame rail 14. Chassis bracket 20 includes mounting pin core 24, which is integral with base portion 20a through which bolts 22 pass into frame rail 14. Elastomeric material 26 is interposed between mounting pin core 24 and rigid shell 28. Of course, the form of rigid shell 28 is best seen from FIG. 1. Those skilled in the art will appreciate that a variety of mounting pin constructions could be employed with the slide out engine mounting system according to the present invention such as mounting systems with and without elastomeric material or urethanes or other types of mounting systems known to those skilled in the art and suggested by this disclosure.

FIG. 2 further illustrates use of fasteners 34 to retain first portion 36 of engine bracket 32 to engine 16. As noted above, FIG. 2 further illustrates the fact that retainer 44 and engine bracket 32 cooperate to confine an axially extended portion of mounting pin, in this case rigid shell 20a. As shown in the various figures, mounting pin core 24 and rigid shell 20a extend laterally and perpendicularly to the centerline of the vehicle frame and into the engine compartment.

Figure 5:
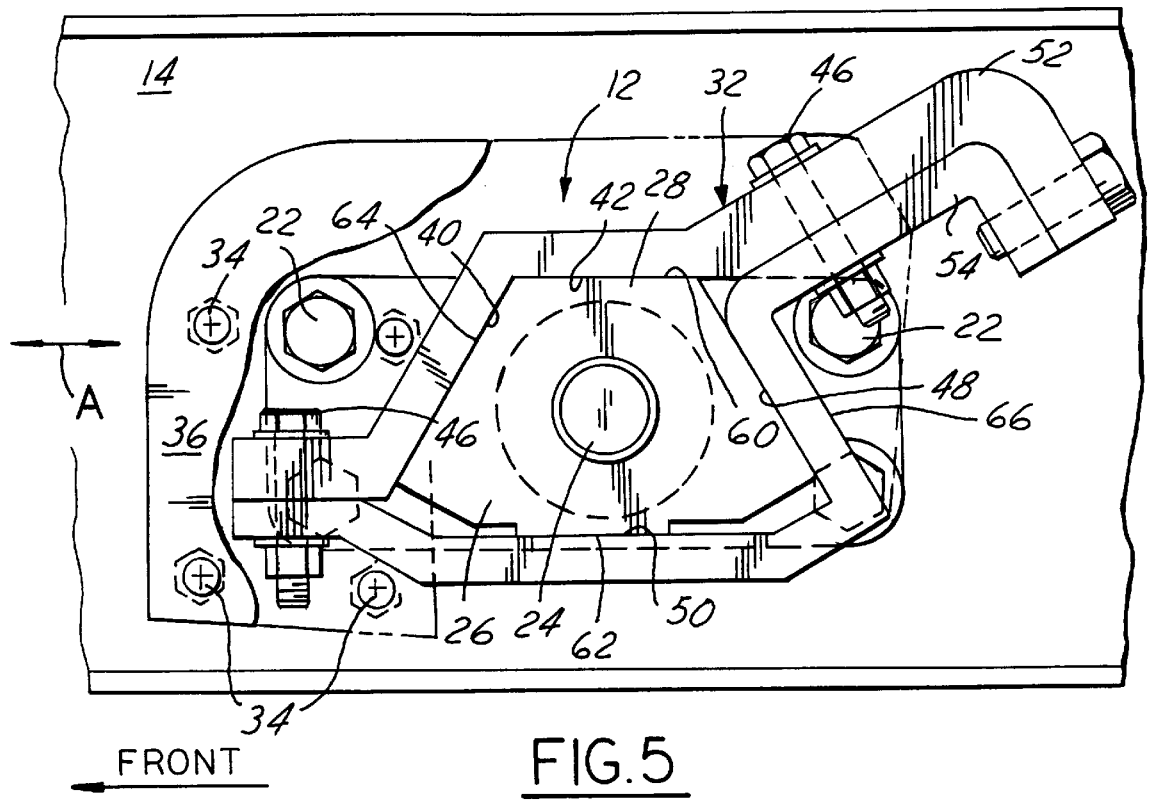
FIG. 5 is a side view of a second embodiment of a slide out engine mounting system according to the present invention.

FIG. 5 illustrates a second embodiment of an engine mounting system according to the present invention in which installation abutment 30 is omitted. Accordingly, the only tactile cue available to the engine installer will occur when surface 40 of engine bracket 32 and front inclined portion 64 of rigid shell 28 come into contact with each other.

While the invention has been shown and described in its preferred embodiments, it will be clear to those skilled in the arts to which it pertains that many changes and modifications may be made thereto without departing from the scope of the claimed invention.

We claim:

1. An engine and slide out mounting system for supporting the engine upon a chassis frame within the engine compartment of an automotive vehicle, with said mounting system comprising:

a chassis bracket attached to the chassis frame, with said chassis bracket having a mounting pin extending laterally and perpendicularly to the centerline of the frame and into the engine compartment, with said mounting pin defining a multiplanar mounting surface having horizontal upper and lower portions and front and rear inclined portions extending between the upper and lower portions; and an engine bracket, rigidly attached to the engine, with said engine bracket having a first portion for attaching the engine bracket to the engine, and a second portion having at least one generally horizontal surface for slidably engaging the horizontal upper portion of the mounting pin and an inclined surface for abuttingly engaging the front inclined portion of the mounting pin such that when the inclined surface abuts the front inclined portion of the mounting pin the engine is prohibited from moving rearwardly in the chassis; and wherein said engine bracket further comprises a hook integral with the engine bracket and extending rearwardly from the portion of the engine bracket defining the generally horizontal surface, with said hook being adapted to engage the rear inclined portion of the mounting pin in the event that the engine slides forward in the chassis from an installed position.

2. An engine and mounting system according to claim 1, further comprising a retainer for maintaining the engine bracket in engagement with the chassis bracket, with said retainer being removably attached to said engine bracket, and with said retainer having an inclined portion for engaging the rear inclined portion of the mounting pin and a slider portion engaging the horizontal lower portion of the mounting pin.

* * * * *